(12) United States Patent
Iio et al.

(10) Patent No.: US 10,895,284 B2
(45) Date of Patent: Jan. 19, 2021

(54) BEARING UNIT AND MOTOR

(71) Applicant: MABUCHI MOTOR CO., LTD., Chiba (JP)

(72) Inventors: Shinya Iio, Chiba (JP); Yoshinobu Katsuta, Chiba (JP); Satoshi Shimuzu, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 16/585,002

(22) Filed: Sep. 27, 2019

(65) Prior Publication Data

US 2020/0102983 A1 Apr. 2, 2020

(30) Foreign Application Priority Data

Sep. 28, 2018 (JP) ................................ 2018-183713

(51) Int. Cl.
  *F16C 33/10* (2006.01)
  *F16C 17/02* (2006.01)

(52) U.S. Cl.
  CPC ............ *F16C 33/104* (2013.01); *F16C 17/02* (2013.01)

(58) Field of Classification Search
  CPC ...... F16C 17/02; F16C 33/104; F16C 33/128; F16C 2380/26; H02K 5/167; H02K 5/1672; H02K 5/1675; H02K 5/1677
  See application file for complete search history.

(56) References Cited

U.S. PATENT DOCUMENTS

| | | | | |
|---|---|---|---|---|
| 5,164,256 A | * | 11/1992 | Sato | F16C 33/102 428/304.4 |
| 5,899,572 A | * | 5/1999 | Strobl | F16C 33/104 384/279 |
| 6,008,557 A | | 12/1999 | Dornhoefer et al. | |
| 6,012,849 A | * | 1/2000 | Takagi | F16C 23/045 384/204 |

(Continued)

FOREIGN PATENT DOCUMENTS

| CN | 101001030 A | 7/2007 |
|---|---|---|
| CN | 106795916 A | 5/2017 |

(Continued)

OTHER PUBLICATIONS

Office Action in CN Application No. 201910852873.8, dated Oct. 10, 2020, 14pp.

*Primary Examiner* — Phillip A Johnson
(74) *Attorney, Agent, or Firm* — Hauptman Ham, LLP

(57) ABSTRACT

A bearing unit includes: an impregnated bearing that rotatably supports a shaft of a rotor; a storage part which is formed in a manner that an end surface of a housing incorporating the rotor in an axial direction becomes convex toward an outer side and which stores the impregnated bearing in a non-rotatable manner; and an oil return washer which is placed to face an end surface of the impregnated bearing stored in the storage part and which integrally rotates with the shaft. The storage part has a bottom tubular shape, and includes an inner surface and a bottom surface, and the oil return washer is placed in a manner that the facing surface overlaps with the inner surface of the storage part when viewed from a radial direction, and includes a circulation part that receives oil leaked from the impregnated bearing and returns the oil to the impregnated bearing.

9 Claims, 3 Drawing Sheets

(56) References Cited

U.S. PATENT DOCUMENTS

| | | | |
|---|---|---|---|
| 2003/0179965 A1* | 9/2003 | Ewert | F16C 33/104 384/279 |
| 2007/0165972 A1 | 7/2007 | Nishino | |
| 2013/0285496 A1* | 10/2013 | Boccadamo | H02K 15/14 310/90 |
| 2017/0276176 A1 | 9/2017 | Hirata et al. | |

FOREIGN PATENT DOCUMENTS

| | | | | |
|---|---|---|---|---|
| CN | 107956804 A | | 4/2018 | |
| DE | 2450774 A1 | * | 5/1975 | ............ F16C 17/08 |
| GB | 885694 A | * | 12/1961 | ............ F16C 33/109 |
| JP | H5-49203 A | | 2/1993 | |
| JP | H7-30786 B2 | | 4/1995 | |
| JP | H8-172745 A | | 7/1996 | |

* cited by examiner

BEARING UNIT AND MOTOR

RELATED APPLICATIONS

The present application claims priority to Japanese Application No. 2018-183713 filed Sep. 28, 2018, the disclosure of which is hereby incorporated by reference herein in its entirety.

BACKGROUND

1. Technical Field

The present disclosure relates to a bearing unit including an oil-retaining bearing that rotatably supports a shaft, and a motor to which the bearing unit is applied.

2. Description of the Related Art

An oil-retaining bearing may be used as a bearing that rotatably supports a shaft in a motor used for office equipment, on-vehicle electrical equipment, and the like. In the oil-retaining bearing (hereinafter also referred to as a "bearing"), a viscous oil film is interposed between two surfaces that slide relatively (that is, between the inner peripheral surface of the bearing and the outer peripheral surface of the shaft), and the shaft is supported by the pressure of the oil film. The oil (hereinafter referred to as "bearing oil") is caused when lubrication oil impregnated in the pores of the bearing, which is a sintered body, is leaked to the surface because of the suction force due to the rotation of the shaft and temperature rise of the bearing. A structure in which a washer for suppressing scattering of the oil leaked from the bearing is provided to integrally rotate with the shaft is known (see JP-A-5-49203 for example).

SUMMARY

By the way, the oil leaked from the bearing is naturally absorbed into the pores as long as it is in contact with the surface of the bearing and contributes the formation of the viscous oil film again. However, when oil that is leaked from the bearing because of the rotation of the rotor is scattered to the periphery, the oil is unable to return to the bearing, and this decreases the bearing oil. When the bearing oil decreases, lubrication becomes insufficient, causing metal contact between the shaft and the bearing. It may result in abnormal sliding sound and irregularity of motor current values, and may promote the abrasion of the bearing.

The present disclosure has been made in view of the above issues, and one object is to suppress decrease in the bearing oil in a bearing unit including an oil-retaining bearing. In addition, another object is to provide a motor capable of improving quality and life by suppressing decrease in the bearing oil. Without being limited to these objects, another object is to achieve effects which are derived from each configuration shown in the embodiment for carrying out the disclosure to be described later and which are not able to be obtained by the related art.

(1) A bearing unit disclosed here includes: an impregnated bearing that rotatably supports a shaft of a rotor; a storage part which is formed in a manner that an end surface of a housing incorporating the rotor in an axial direction becomes convex toward an outer side and which stores the impregnated bearing in a non-rotatable manner; and an oil return washer which is placed to face an end surface of the impregnated bearing stored in the storage part, the end surface facing a side of the rotor, and which integrally rotates with the shaft. The storage part has a bottom tubular shape having a constant cross-sectional shape that is orthogonal to the axial direction, and includes an inner surface that extends in the axial direction and a bottom surface that is orthogonal to the inner surface, and the oil return washer is placed in a manner that the facing surface that faces the end surface of the impregnated bearing overlaps with the inner surface of the storage part when viewed from a radial direction, and includes a circulation part that is formed on the facing surface, receives oil leaked from the impregnated bearing, and returns the oil to the impregnated bearing.

(2) The circulation part preferably includes a holding groove formed by cutting out a part that is in contact with the shaft from a side of the facing surface.

(3) The circulation part preferably includes a plurality of guide grooves that are recessed in an intermediate part of the facing surface in the radial direction and arranged in parallel at intervals in a circumferential direction.

(4) The guide grooves each preferably have a side surface on an outer side in the radial direction that is inclined toward the end surface of the impregnated bearing in a state in which the oil return washer is fixed to the shaft.

(5) The circulation part is preferably located between the guide grooves that are adjacent in the circumferential direction, and preferably includes a wall part that collides with oil in the guide grooves when the rotor rotates. In this case, a side surface of the wall part that extends in a direction intersecting the circumferential direction is preferably inclined in a manner that an angle formed by the side surface and the facing surface becomes an obtuse angle.

(6) The oil return washer preferably includes a scattering suppression groove formed by cutting out a part that is in contact with the rotor or the shaft from a surface side opposite to the facing surface.

(7) The entire oil return washer is preferably placed inside the storage part.

(8) A through hole where the shaft is preferably inserted is formed on the bottom surface of the storage part, and the bearing unit may preferably be provided with an oil stop washer which is held between the impregnated bearing and the bottom surface of the storage part and which has a smaller inner diameter than an inner diameter of the through hole.

(9) A motor disclosed here is a motor including a stator and a rotor that are incorporated in a housing the bearing unit. The bearing unit according to any one of (1) to (8) is applied to an impregnated bearing rotatably supporting a shaft that integrally rotates with the rotor and an end bell which closes an opening of the housing and to which the impregnated bearing is fixed.

According to the disclosed bearing unit, the oil return washer that co-rotates with the shaft can circulate the oil leaked from the impregnated bearing in the storage part; therefore, leakage from the storage part to the outside can be suppressed. In addition, since the oil return washer that receives the oil co-rotates with the shaft, the oil can be returned to the bearing side using the centrifugal force. As a result, oil decrease of the impregnated bearing can be suppressed, and it is possible to suppress the occurrence of abnormal sliding sound and irregularity of current values caused by insufficient oil.

Further, according to the disclosed motor, the decrease in the bearing oil can be suppressed; therefore, the quality and the life of the motor can be improved.

DESCRIPTION OF THE EMBODIMENTS

A bearing unit and a motor will be described as an embodiment with reference to the drawings. The embodiment below is merely an example, and there is no intention to eliminate various modifications and application of techniques that are not clearly expressed in the embodiment. Various modifications may be made to the configurations of the present embodiment without departing from the spirit of the configurations. In addition, it is possible to make selection as appropriate and make combinations appropriately.

[1. Configuration]

Figure 1:
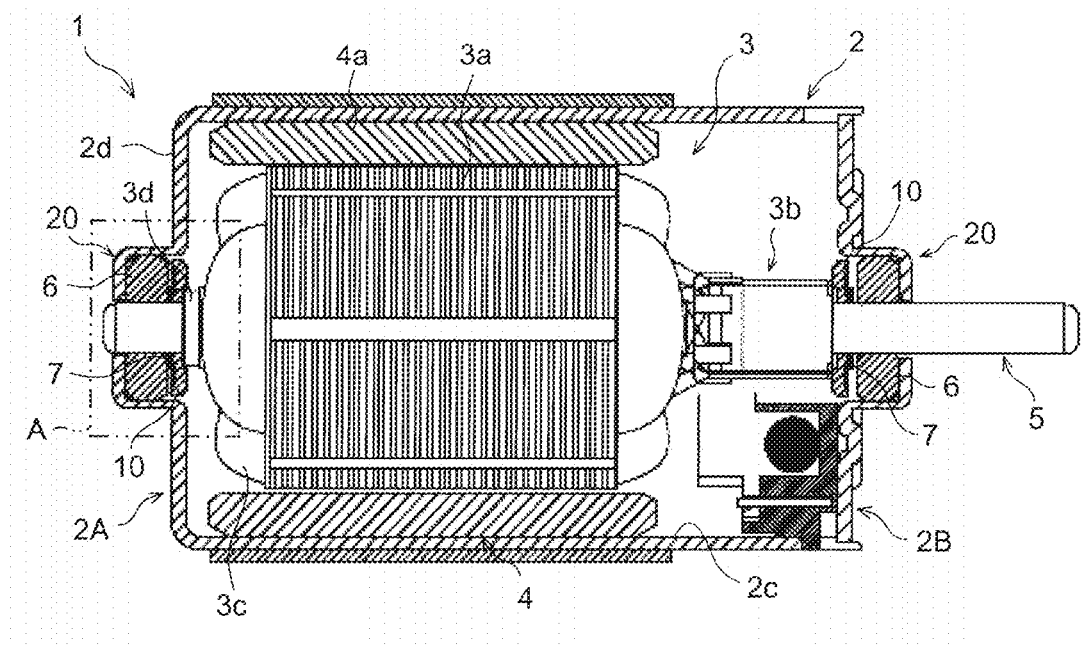
FIG. 1 is a schematic axial cross-sectional view showing a motor according to an embodiment.
Figure 2:
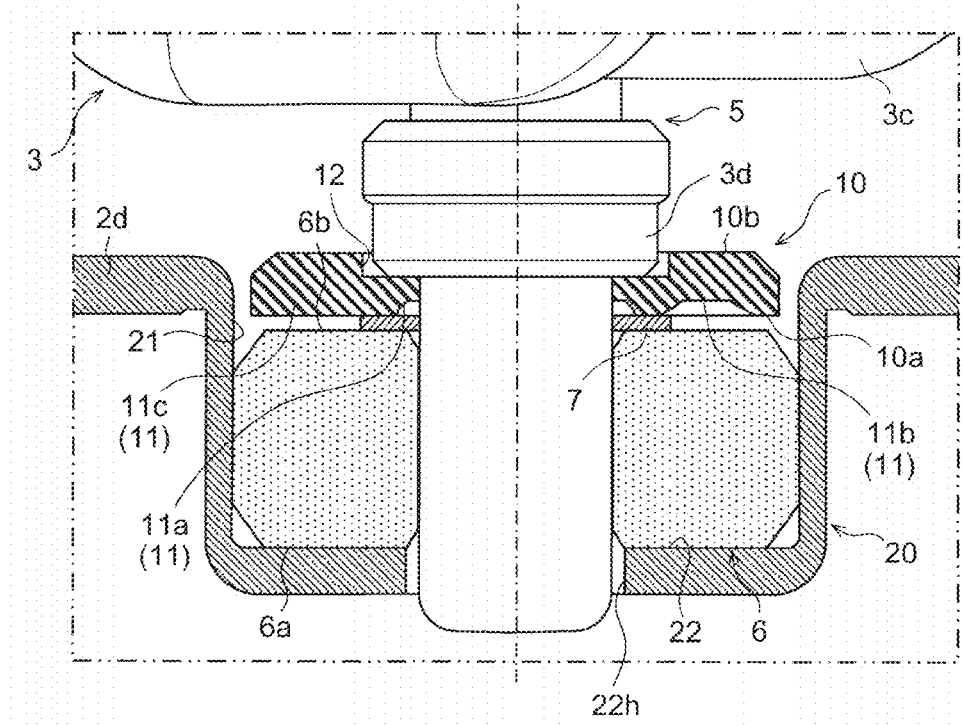
FIG. 2 is an axial cross-sectional view (enlarged view of part A of FIG. 1) showing a bearing unit according to the embodiment.

FIG. 1 is an axial cross-sectional view showing a motor 1 according to an embodiment, and FIG. 2 is an axial cross-sectional view (enlarged view of part A of FIG. 1) showing a bearing unit according to the embodiment. The motor 1 according to the present embodiment is a small motor used for office equipment, home electric equipment, and the like. The motor 1 of the present embodiment is exemplified by a DC motor with a brush, but the type and the use of the motor are not particularly limited.

As shown in FIG. 1, the motor 1 includes a rotor 3 and a stator 4 that are incorporated in a housing 2. The rotor 3 includes a rotor core 3a and a commutator 3b that are fixed to a shaft 5, a coil 3c that is wound around the rotor core 3a, and the like. The stator 4 includes a magnet 4a that is fixed to an inner peripheral surface 2c of the housing 2. The housing 2 includes a main body 2A that is formed in a bottomed tubular shape and an end bell 2B that closes the opening of the main body 2A. A bottom part 2d and the end bell 2B of the main body 2A extend in a direction that is orthogonal to the axial direction, each forming the axial end surface of the housing 2.

The bottom part 2d and the end bell 2B of the housing 2 are each provided with a storage part 20 that stores an impregnated bearing 6 (hereinafter referred to as a "bearing 6") in a non-rotatable manner. The storage part 20 is a part that is formed in a manner that the bottom part 2d and the end bell 2B become convex toward the outside. As shown in FIG. 2, the storage part 20 has a bottomed tubular shape having a constant cross-sectional shape that is orthogonal to the axial direction, and includes an inner surface 21 that extends in the axial direction and a bottom surface 22 that is continuously provided to be orthogonal to the inner surface 21. The storage part 20 of the present embodiment is formed in a bottomed tubular shape. The inner surface 21 is a tubular surface having a constant inner diameter in the axial direction, and the bottom surface 22 is in a circle shape that is formed continuously to one end of the inner surface 21 in the axial direction. A through hole 22h where the shaft 5 is inserted is formed on each of the bottom surfaces 22 of the storage part 20.

The bearing 6 is a tubular sintered body impregnated with lubricating oil, and rotatably supports the shaft 5 of the rotor 3. The bearing 6 of the present embodiment is formed in a tubular shape, and is press-fitted and fixed to the two storage parts 20 as shown in FIG. 1. When the shaft 5 rotates, a so-called pump action occurs and the oil in the pores is sucked to the outside. Thus, an oil film is formed between the bearing 6 and the shaft 5. When the shaft 5 is rotating, the oil in the pores is sucked to the outside and the oil in the periphery of the bearing 6 is absorbed into the pores. On the other hand, when the rotation of the shaft 5 stops, the oil that in contact with the surface of the bearing 6 is absorbed into the pores by capillary phenomenon.

As shown in FIG. 2, in the bearing 6, an end surface 6a (hereinafter referred to as an "outer end surface 6a") that is facing the side of the bottom surface 22 of the storage part 20 is placed on the bottom surface 22 in a manner that the surfaces come into contact with each other, an end surface 6b (hereinafter referred to as an "inner end surface 6b") that is facing the side of the rotor 3 is fixed to the housing 2 to be completely stored in the storage part 20. In other words, the depth of the storage part 20 (axial dimension of the inner surface 21) is longer than the axial length of the bearing 6. In the motor 1 of the present embodiment, an adjustment washer 7 is placed in a manner that that the surface comes into contact with the inner end surface 6b of the bearing 6. The adjustment washer 7 is lightly press-fitted to the shaft 5 to rotate integrally with the shaft 5, and has a function of adjusting the axial position of the rotor 3. The adjusting washer 7 is made of resin, and is formed in an annular shape that covers the radial inner portion of the inner end surface 6b of the bearing 6.

Figure 3:
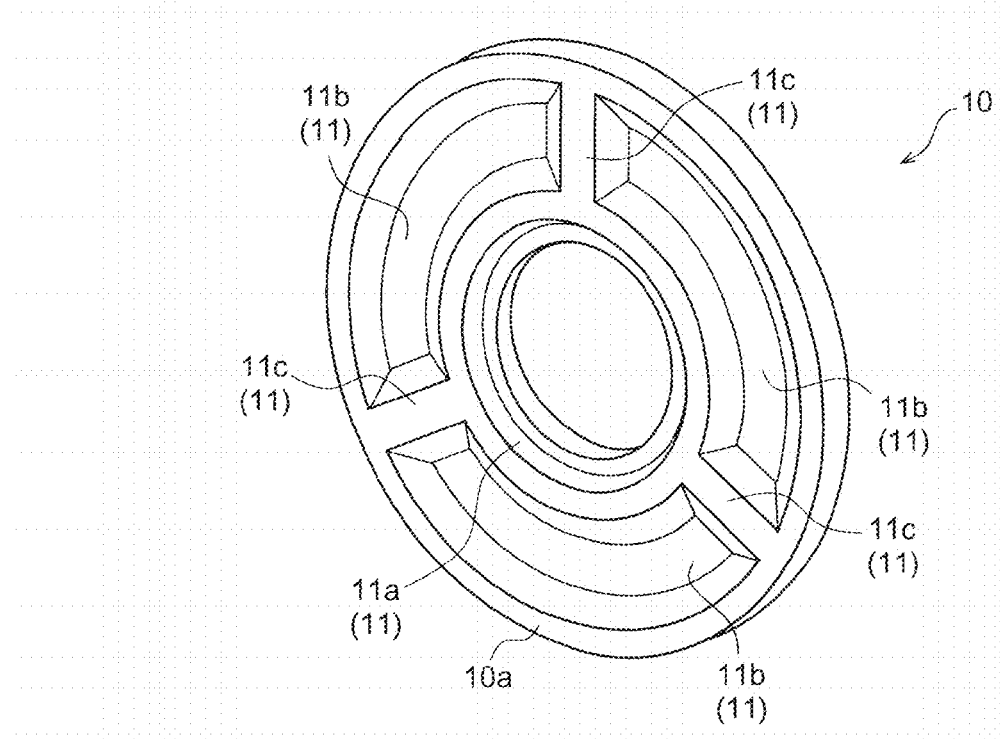
FIG. 3 is a perspective view of an oil return washer included in the bearing unit of FIG. 2.

Further, an oil return washer 10 that integrally rotates with the shaft 5 is provided in the motor 1. As shown in FIG. 1, the oil return washer 10 is placed facing the inner end surface 6b of the bearing 6 that is stored in the storage part 20, and has a function of returning, to the bearing 6, the oil that is sucked and leaked to the outside of the bearing 6. As shown in FIG. 3, the oil return washer 10 has a disk shape having a circular hole at the center, and has a surface formed in an uneven shape. As shown in FIG. 2, a surface of the oil return washer 10 facing the side of the bearing 6 (hereinafter referred to as a "facing surface 10a") comes into contact with the adjustment washer 7, the surface of the oil return washer 10 facing the side of the rotor 3 (a surface on the opposite side of the facing surface 10a and hereinafter referred to as an "inner surface 10b") comes into contact with a rotor bush 3d that integrally rotates with the shaft 5. When the surfaces of the rotor bush 3d and the oil return washer 10 come into contact with each other, the axial position of the rotor 3 is determined.

The impregnated bearing 6, the storage part 20 of the housing 2, and the oil return washer 10 that are described above are the main parts forming the bearing unit of the present embodiment. The bearing unit will be described in detail below. In the following, description will be given focusing on the bearing 6 that is fixed on the side of the bottom part 2d of the housing 2 for convenience, but a similar bearing unit can be applied to the bearing 6 that is fixed on the side of the end bell 2B.

In the bearing unit of the present embodiment, the oil return washer 10 that co-rotates with the shaft 5 is provided with a structure that receives the oil leaked from the bearing 6 and returns the oil to the bearing 6 (hereinafter referred to as a "circulation part 11"). The circulation part 11 is formed on the facing surface 10a of the oil return washer 10. Further, the oil return washer 10 is placed in a manner that the facing surface 10a is stored in the storage part 20. That is, as shown in FIG. 2, the oil return washer 10 is placed in the storage part 20 in a manner that the facing surface 10a overlaps with the inner surface 21 when viewed from the radial direction.

Such placement and the circulation part 11 restrain the oil leaked from the bearing 6 when the rotor 3 is rotating from being scattered to the outside of the storage part 20 and circulates the oil in the storage part 20. The oil return washer 10 of the present embodiment is made of resin, and is placed having slight clearance with the inner surface 21 of the storage part 20. In other words, slight clearance is formed between the radial outer edge of the oil return washer 10 and the inner surface 21. Since the oil return washer 10 is made of resin, the clearance can be made as small as possible. Thus, oil leakage from the outside of the oil return washer 10 in the radial direction is suppressed.

As shown in FIG. 2 to FIG. 5, the oil return washer 10 of the present embodiment includes a holding groove 11a formed by cutting out a part that is in contact with the shaft 5 from the side of the facing surface 10a, and a plurality of guide grooves 11b that is recessed in the intermediate part of the facing surface 10a in the radial direction and is arranged in parallel at intervals in the circumferential direction. Both of the holding groove 11a and the guide grooves 11b are a part of the circulation part 11 that receives oil leaked from the bearing 6 and returns the oil to the bearing 6. The arrows in FIG. 5 indicate the flow of oil when the rotor 3 is rotating.

Figure 4:
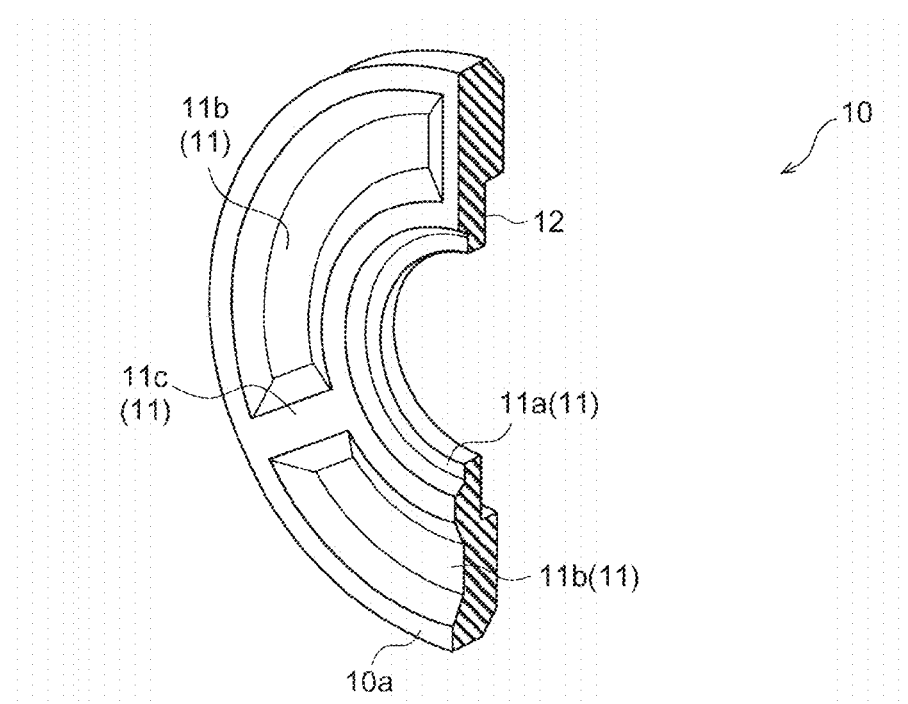
FIG. 4 is a perspective view showing a radial cross section of the oil return washer of FIG. 3.
Figure 5:
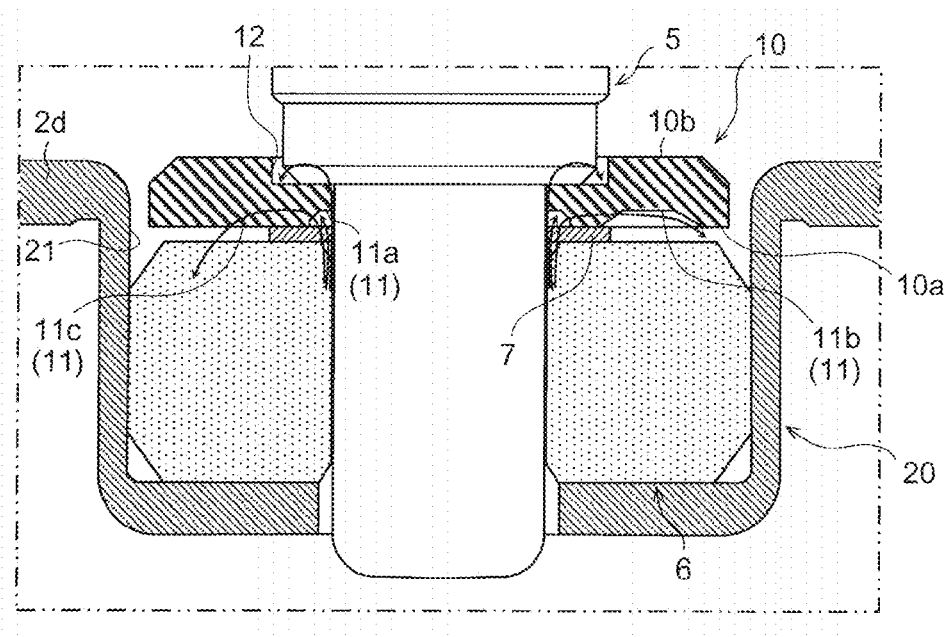
FIG. 5 is a drawing illustrating an action of the bearing unit of FIG. 2.

As shown in FIG. 2 to FIG. 4, the holding groove 11a is an annular groove formed by cutting out the edge part on the inner side of the facing surface 10a in the radial direction and is opened toward the side of the bearing 6 in the state in which the holding groove 11a is fixed to the shaft 5. As indicated by the arrows in FIG. 5, the holding groove 11a has a function of holding the oil which is leaked from the bearing 6 when the rotor 3 is rotating and which is leaked to the side of the oil return washer 10 from the inner side of the adjustment washer 7 in the radial direction, and a function of returning the held oil to the inner side part of the bearing 6 in the radial direction when the rotor 3 is stopped. The depth (axial dimension) and the width (radial dimension) of the holding groove 11a are appropriately set to the extent in which oil that may leak can be held while the strength of the oil return washer 10 and the contact surface of the shaft 5 and the oil return washer 10 are secured.

As shown in FIG. 2 to FIG. 4, the guide groove 11b is a groove that is placed on the outer side of the holding groove 11a in the radial direction and is opened toward the side of the bearing 6 in the state in which the guide groove 11b is fixed to the shaft 5. The oil held by the holding groove 11a flows into the guide groove 11b by the centrifugal force. The guide groove 11b of the present embodiment has an annular fan shape when viewed from the axial direction and is recessed on the facing surface 10a in a manner that the cross-sectional shape along the radial direction becomes a trapezoid. That is, the side surfaces of both ends of the guide groove 11b in the radial direction are inclined surfaces. In the oil return washer 10 of the present embodiment, three guide grooves 11b having the same shape are placed at equal intervals in the circumferential direction (that is, at a position shifted by 120 degrees). The side surface on the outer side of the guide groove 11b in the radial direction is inclined toward the inner end surface 6b of the bearing 6 in the state in which the side surface is fixed to the shaft 5. As indicated by the arrows in FIG. 5, the oil flowing to the outer side in the radial direction along the guide groove 11b is led to the bearing 6.

As shown in FIG. 2 to FIG. 4, a wall part 11c that is left without having the facing surface 10a that is recessed is present between the two guide grooves 11b that are adjacent to each other in the circumferential direction. That is, three wall parts 11c are extended in the radial direction in the oil return washer 10 of the present embodiment. As indicated by the arrows in FIG. 5, the wall part 11c has a function of colliding with the oil in the guide groove 11b when the rotor 3 is rotating and assists the oil to easily be scattered to the outer side in the radial direction. That is, in the oil return washer 10 of the present embodiment, the wall part 11c is included in the circulation part 11.

Regarding the wall part 11c of the present embodiment, the side surface extending in the direction that intersects the circumferential direction (here, the side surface extending in the radial direction) and the facing surface 10a are inclined in a manner that the angle formed by both side surfaces becomes an obtuse angle. The wall part 11c of the present embodiment is extended in the radial direction because it is formed as a part where the facing surface 10a is not recessed; however, the configuration of the wall part 11c is not limited to this, and any shape may be used as long as the oil flowing from the holding groove 11a to the guide groove 11b is likely to be scattered to the outer side in the radial direction. For example, a wall part may be provided to protrude from the facing surface 10a, or may be extended in a manner that both surfaces become orthogonal to the facing surface 10a.

Further, the oil return washer 10 of the present embodiment has a scattering suppression groove 12 that is formed by cutting out a part that comes into contact with the rotor 3 or the shaft 5 from the side of the inner surface 10b. The scattering suppression groove 12 is an annular groove formed by cutting out the end on the inner side of the inner surface 10b in the radial direction and is opened toward the side of the coil 3c in the state in which the scattering suppression groove 12 is fixed to the shaft 5. The scattering suppression groove 12 has a function of suppressing the scattering of the oil which is leaked from the bearing 6 when the rotor 3 is rotating and which is leaked from the inner side of the adjustment washer 7 and the oil return washer 10 in the radial direction to the side of a rotor bush 3d by storing the oil.

In the scattering suppression groove 12 of the present embodiment, a part that comes into contact with the rotor bush 3d of the rotor 3 is cut out, and the scattering suppression groove 12 is formed in such a size that allows one end of the rotor bush 3d in the axial direction to be stored. That is, the rotor 3 of the present embodiment is fixed to the shaft 5 in the state in which the end surface of the rotor bush 3d in the axial direction and the bottom surface of the scattering suppression groove 12 of the oil return washer 10 abut on each other. Regarding the scattering suppression groove 12 of the present embodiment, the axial cross-sectional shape is formed in a rectangular shape; however, the cross-sectional shape is not limited to this, and any shape may be used as long as the oil leaked to the side of the inner surface 10b is unlikely to be scattered.

The oil return washer 10 of the present embodiment includes an oil repellent surface that has been subjected to oil repellent treatment at least on the facing surface 10a and the scattering suppression groove 12. The oil repellent treatment is a treatment for applying an oil repellent treatment agent that repels oil. The oil adhered to the oil repellent surface becomes spherical without spreading; therefore, the oil received by the facing surface 10a of the oil return washer 10 and the oil held by the scattering suppression groove 12 are easily returned to the bearing 6 for example. The oil repellent treatment may be applied to the entire surface of the oil return washer 10, or the oil repellent treatment may be omitted.

[2. Action and Effect]

(1) According to the above bearing unit, the oil return washer 10 that co-rotates with the shaft 5 can circulate the oil leaked from the bearing 6 in the storage part 20; therefore, leakage from the storage part 20 to the outside can be suppressed. In addition, since the oil return washer 10 that receives the oil co-rotates with the shaft 5, the oil can be returned to side of the bearing 6 using the centrifugal force. As a result, the oil decrease of the bearing 6 can be suppressed, and it is also possible to suppress the occurrence of abnormal sliding sound and irregularity of current values caused by insufficient oil, increase in the rotational load, and promotion of abrasion.

(2) According to the above bearing unit, the circulation part 11 includes the holding groove 11a; therefore, it is possible to receive the oil leaked from the side of the contact surface of the bearing 6 and the shaft 5 by the holding groove 11a. The holding groove 11a is opened toward the side of the bearing 6. Thus, the oil received by the holding groove 11a can be returned to the inner side part of the bearing 6 in the radial direction when the rotor 3 is stopped. As a result, the oil decrease of the bearing 6 can be suppressed further.

(3) According to the above bearing unit, the circulation part 11 includes the plurality of guide grooves 11b; therefore, the oil leaked from the bearing 6 or the oil received by the holding groove 11a can be returned to the bearing 6 via the guide grooves 11b when the rotor 3 is rotating. In addition, the wall part 11c is provided between the guide grooves 11b that are adjacent to each other in the circumferential direction; therefore, the wall part 11c collides with the oil in the guide grooves 11b when the rotor 3 is rotating, allowing the oil to be easily scattered to the outer side in the radial direction. As a result, it is possible to promote the circulation of the oil in the storage part 20 and suppress the oil decrease of the bearing 6.

(4) The above oil return washer 10 is provided with a side surface on the outer side of the guide groove 11b in the radial direction as an inclined surface; therefore, the oil flowing to the outer side in the radial direction along the guide groove 11b can smoothly be led to the bearing 6. As a result, it is possible to promote the circulation of the oil in the storage part 20 and further suppress the oil decrease of the bearing 6.

(5) In addition, regarding the above oil return washer 10, a side surface that is extended in the direction intersecting the circumferential direction of the wall part 11c is provided as an inclined surface; therefore, the side surface collides with the oil in the guide groove 11b when the rotor 3 is rotating, and the oil can smoothly be led to the bearing 6. This can also promote the circulation of the oil in the storage part 20 and further suppress decrease in the oil in the bearing 6.

(6) According to the above bearing unit, a scattering suppression wall 13 is provided on the inner surface 10b of the oil return washer 10; therefore, the oil leaked to the side of the rotor 3 (the side of the coil 3c) along the shaft 5 can be received. Thus, since the scattering of oil can be suppressed, the oil decrease of the bearing 6 can be suppressed effectively.

(7) According to the motor 1 to which the above bearing unit is applied, the oil leaked from the bearing 6 can be circulated in the storage part 20; therefore, the oil decrease can be suppressed, and the quality and the life of the motor 1 can be improved.

[3. Others]

The above bearing unit is an example, and the configuration is not limited to the above description. In the above bearing unit, the facing surface 10a of the oil return washer 10 is placed to be stored in the storage part 20 but also may be placed in a manner that the entire oil return washer 10 is stored inside the storage part 20. With such a configuration, it is possible to restrain the oil leaked from the bearing 6 from leaking outside the storage part 20, and the oil can be circulated in the storage part 20. As a result, the oil decrease can be suppressed further.

Figure 6:
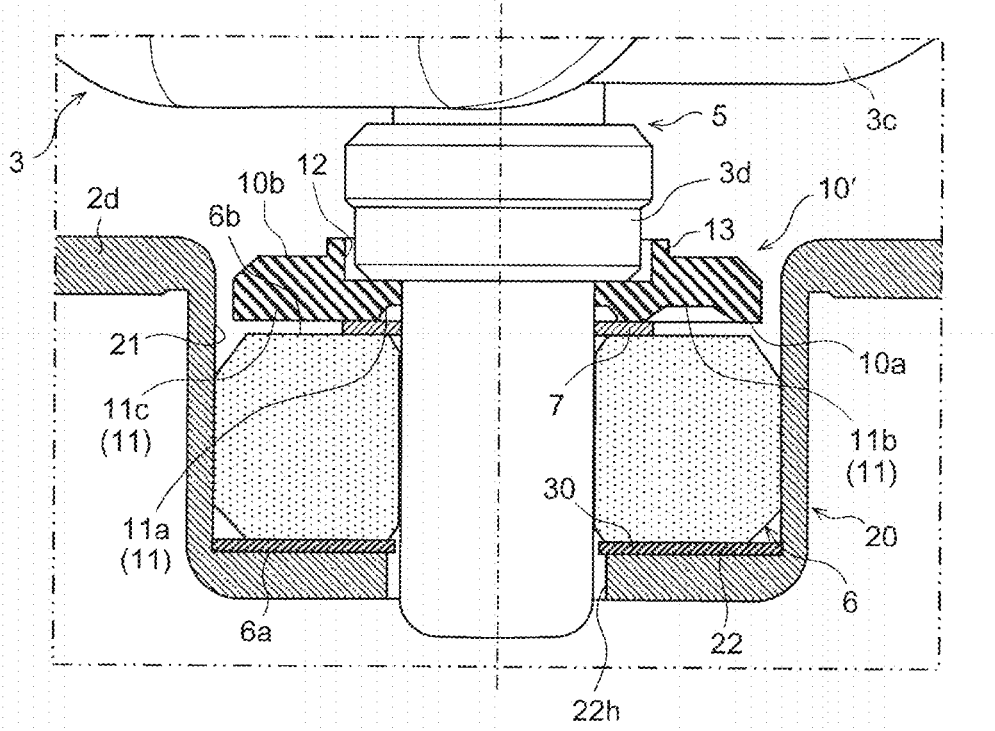
FIG. 6 is an axial cross-sectional view showing a bearing unit according to a modification example (corresponding to the enlarged view part A of FIG. 1).

The above bearing unit may be modified as shown in FIG. 6. The bearing unit shown in FIG. 6 includes an oil return washer 10' having a different shape compared with the oil return washer 10 shown in FIG. 2 to FIG. 4, and differs from other bearing units in that it includes an oil stop washer 30 on the side of the bottom surface 22 of the storage part 20. The oil return washer 10' includes the scattering suppression wall 13 that is erected on the edge of the scattering suppression groove 12 on the inner surface 10b. The scattering suppression wall 13 is a tubular wall part erected along the axial direction. Since the depth of the scattering suppression groove 12 becomes deeper by the scattering suppression wall 13, the scattering of oil can be suppressed effectively.

The oil stop washer 30 is made of cloth Bakelite for example, and is formed in an annular shape covering substantially the entire surface of the outer end surface 6a of the bearing 6. The oil stop washer 30 is press-fitted into the storage part 20, and is held between the bottom surface 22 of the storage part 20 and the bearing 6. The inner diameter of the oil stop washer 30 is formed smaller than the through hole 22h of the bottom surface 22; therefore, it is possible to restrain the oil in the bearing 6 from leaking from the side of the through hole 22h. That is, the oil decrease of the bearing 6 can be suppressed further.

The bearing unit shown in FIG. 6 exemplifies the case where the entire oil return washer 10' is stored in the storage part 20, but the placement of the oil return washer 10' is not limited to this. Any placement may be used as long as the facing surface 10a is located in the storage part 20, and the scattering suppression wall 13 may be out of the storage part 20 for example. In addition, the shape and the fixing method of the oil stop washer 30 are not limited to the above description. The oil stop washer 30 shown in FIG. 6 may be applied to the bearing unit shown in FIG. 2. Alternatively, the oil stop washer 30 may be omitted from the bearing unit shown in FIG. 6.

The configuration of the above circulation part 11 is an example and is not limited to the above description. For example, a projection that serves as the circulation part 11 may be provided in the guide groove 11b in a manner that the oil along the guide groove 11b is easily scattered to the outer side in the radial direction. In addition, one or two of the above holding groove 11a, the guide groove 11b, and the wall part 11c may be provided. The scattering suppression groove 12 does not have to be provided and may be omitted. The adjustment washer 7 also does not have to be provided. In addition, the material of the oil return washer 10, 10' and the oil stop washer 30 is an example, and the other materials that are not described above may be used.

The above motor 1 is an example and is not limited to the above configuration. For example, the housing 2 and the storage part 20 may not have a bottomed tubular shape, and the through hole 22h may not be formed in the bottom surface 22 of the storage part 20 that has no commutator 3b. In addition, the bearing unit that is applied to the bearing 6 on the side of the bottom part 2d of the housing 2 and the bearing unit that is applied to the bearing 6 on the side of the end bell 2B may have different configurations. For example, the oil return washer 10' in FIG. 6 may be provided on the former bearing unit, and the oil return washer 10 in FIG. 2 may be provided on the latter bearing unit. The above bearing unit may be applied to products other than a motor.

What is claimed is:

1. A bearing unit comprising:
   an impregnated bearing that rotatably supports a shaft of a rotor;
   a storage part which is formed in a manner that an end surface of a housing incorporating the rotor in an axial direction becomes convex toward an outer side and which stores the impregnated bearing in a non-rotatable manner; and
   an oil return washer which is placed to face an end surface of the impregnated bearing stored in the storage part, the end surface facing a side of the rotor and which integrally rotates with the shaft, wherein
   the storage part has a bottom tubular shape having a constant cross-sectional shape that is orthogonal to the axial direction, and includes an inner surface that extends in the axial direction and a bottom surface that is orthogonal to the inner surface, and
   the oil return washer is placed in a manner that a facing surface of the oil return washer that faces the end surface of the impregnated bearing overlaps with the inner surface of the storage part when viewed from a radial direction, and includes a circulation part that is formed on the facing surface, receives oil leaked from the impregnated bearing, and returns the oil to the impregnated bearing.

2. The bearing unit according to claim 1, wherein the circulation part includes a holding groove formed by cutting out a part that is in contact with the shaft from a side of the facing surface.

3. The bearing unit according to claim 1, wherein the circulation part includes a plurality of guide grooves that are recessed in an intermediate part of the facing surface in the radial direction and arranged in parallel at intervals in a circumferential direction.

4. The bearing unit according to claim 3, wherein the guide grooves each have a side surface on an outer side in the radial direction, the side surface being inclined toward the end surface of the impregnated bearing in a state in which the oil return washer is fixed to the shaft.

5. The bearing unit according to claim 3, wherein
   the circulation part includes a wall part that is located between the guide grooves that are adjacent in the circumferential direction, and collides with oil in the guide grooves when the rotor rotates, and
   a side surface of the wall part that extends in a direction intersecting the circumferential direction is inclined in a manner that an angle formed by the side surface and the facing surface becomes an obtuse angle.

6. The bearing unit according to claim 1, wherein the oil return washer includes a scattering suppression groove formed by cutting out a part that is in contact with the rotor or the shaft from a surface side opposite to the facing surface.

7. The bearing unit according to claim 1, wherein the entire oil return washer is placed inside the storage part.

8. The bearing unit according to claim 1, wherein
   a through hole where the shaft is inserted is formed on the bottom surface of the storage part, and
   an oil stop washer which is held between the impregnated bearing and the bottom surface of the storage part and which has a smaller inner diameter than an inner diameter of the through hole is provided.

9. A motor including a stator and a rotor that are incorporated in a housing, wherein a bearing unit according claim 1 is applied to the impregnated bearing rotatably supporting the shaft that integrally rotates with the rotor and an end bell which closes an opening of the housing and to which the impregnated bearing is fixed.

* * * * *